United States Patent
Nakagawa

(10) Patent No.: US 10,140,777 B2
(45) Date of Patent: Nov. 27, 2018

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Masashi Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/660,532

(22) Filed: Jul. 26, 2017

(65) Prior Publication Data
US 2018/0040169 A1 Feb. 8, 2018

(30) Foreign Application Priority Data
Aug. 2, 2016 (JP) ................. 2016-152286

(51) Int. Cl.
| | |
|---|---|
| *G06T 19/20* | (2011.01) |
| *G06T 7/11* | (2017.01) |
| *G06T 7/70* | (2017.01) |
| *G06T 5/00* | (2006.01) |
| *G06T 17/30* | (2006.01) |
| *G06T 19/00* | (2011.01) |
| *G06T 17/00* | (2006.01) |

(52) U.S. Cl.
CPC ............ *G06T 19/20* (2013.01); *G06T 5/005* (2013.01); *G06T 7/11* (2017.01); *G06T 7/70* (2017.01); *G06T 17/00* (2013.01); *G06T 17/30* (2013.01); *G06T 19/006* (2013.01); *G06T 2200/04* (2013.01); *G06T 2200/08* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2015/0317037 A1* | 11/2015 | Suzuki | ............... | G06F 3/0425 345/175 |
| 2016/0044298 A1 | 2/2016 | Holz et al. | | |
| 2017/0017830 A1* | 1/2017 | Hanai | ............... | G06F 3/048 |

FOREIGN PATENT DOCUMENTS

JP 2016038889 A 3/2016

OTHER PUBLICATIONS

Besl et al. "A Method for Registration of 3-D Shapes." IEEE Transactions on Pattern Analysis and Machine Intelligence. Feb. 1992:239-256. vol. 14, No. 2.

(Continued)

*Primary Examiner* — Xiao Wu
*Assistant Examiner* — Mohammad H Akhavannik
(74) *Attorney, Agent, or Firm* — Rossi, Kimms & McDowell LLP

(57) ABSTRACT

An information processing apparatus comprises an extraction unit configured to extract a finger region from a captured image; a generation unit configured to generate a finger model from the finger region; a determination unit configured to perform a collision determination for a collision between the finger model and a CG model superimposed on the captured image; and a control unit configured to control a display form of the finger model based on a result of the collision determination.

12 Claims, 9 Drawing Sheets

(56) References Cited

OTHER PUBLICATIONS

Gilbert et al. "A Fast Procedure for Computing the Distance Between Complex Objects in Three-Dimensional Space." IEEE Journal of Robotics and Automation. Apr. 1988:193-203. vol. 4, No. 2.

* cited by examiner

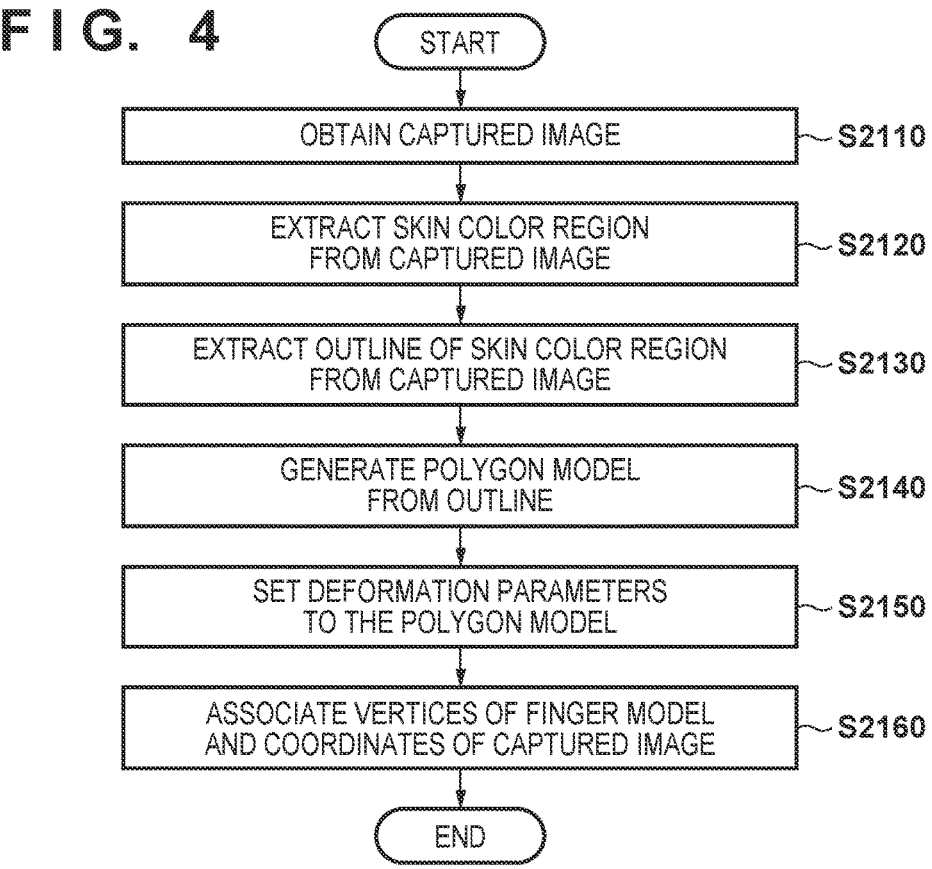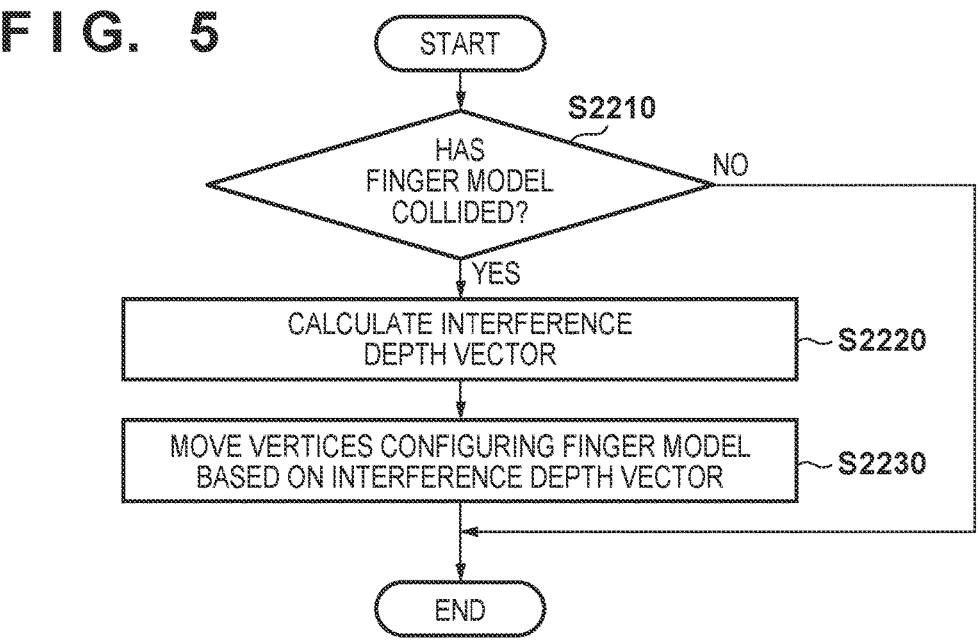

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling an information processing apparatus, and a storage medium.

Description of the Related Art

In recent years, research relating to mixed reality that presents a user with information of a virtual space in real time by superimposing it on a physical space is being conducted. In mixed reality, a composite image that superimposes an image of a virtual space (CG: Computer Graphics) in accordance with a position and orientation of an image capturing apparatus is displayed on some regions or an entire region of an actual video image captured by the image capturing apparatus.

Japanese Patent Laid-Open No. 2016-38889 discloses generation of a three-dimensional finger model that corresponds to a user's hand from a video image of an image capturing apparatus, and direct operation of a CG model in accordance with the finger model.

However, when directly trying to operate a CG model by a finger model, the finger model may sink into the CG model. In such a case, there is the problem in that it becomes difficult to determine how a user is touching the CG model in accordance with the finger model, and an intended operation may not be able to be performed.

The present invention was conceived in view of the above problem, and provides a technique for operating a CG model without impairment of user operationality.

SUMMARY OF THE INVENTION

According to one aspect of the present invention, there is provided an information processing apparatus, comprising: an extraction unit configured to extract a finger region from a captured image; a generation unit configured to generate a finger model from the finger region; a determination unit configured to perform a collision determination for a collision between the finger model and a CG model superimposed on the captured image; and a control unit configured to control a display form of the finger model based on a result of the collision determination.

Further features of the present invention will become apparent from the following description of exemplary embodiments with reference to the attached drawings.

BRIEF DESCRIPTION OF THE DRAWINGS

FIG. 4 is a flowchart that illustrates a processing procedure for a finger model generation unit of the information processing apparatus according to the first embodiment.

FIG. 5 is a flowchart that illustrates a processing procedure for a collision determination unit and a collision response unit of the information processing apparatus according to the first embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the first embodiment, explanation is given for an example of extracting a finger region from a captured image, generating a finger model from the finger region, and controlling a display form of the finger model based on a result of a collision determination between the finger model and a CG model (for example, a virtual video image of an eraser) that is superimposed on the captured image. Specifically, if a collision occurs, at least one of a shape and a display position of the finger model is changed (deformed or moved) to perform an adjustment so as to avoid the collision. By this, it becomes possible to operate the CG model without user operationality being impaired. In addition, processing in which a finger region in a captured image is removed, and the removed region is inpainted. By this, it is possible to hide a misalignment between actual fingers and the finger model, and thereby it becomes possible to operate the CG model with less impairment of operationality.

<Configuration>

Figure 1:
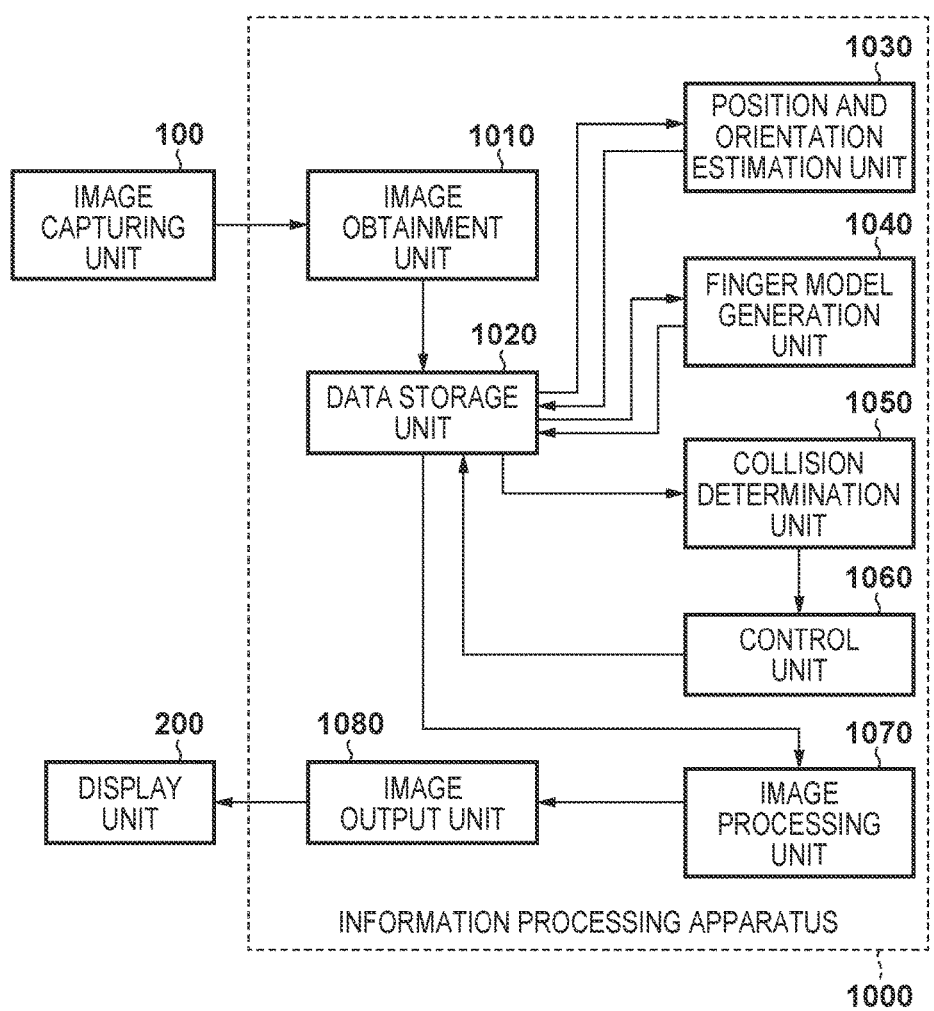
FIG. 1 is a block diagram that illustrates an example of a functional configuration of an information processing apparatus according to a first embodiment.

FIG. 1 illustrates a block diagram of an information processing apparatus for controlling an image capturing unit, according to the present embodiment. In the present embodiment, an image capturing unit 100 and a display unit 200 are connected to an information processing apparatus 1000, as illustrated in FIG. 1. The image capturing unit 100 is a video see-through type HMD (Head-Mounted Display) or a network camera, for example. The display unit 200 is a display such as a PC (Personal Computer) monitor or an HMD, for example.

In addition, the information processing apparatus 1000 is provided with an image obtainment unit 1010, a data storage unit 1020, a position and orientation estimation unit 1030, a finger model generation unit 1040, a collision determination unit 1050, a control unit 1060, an image processing unit 1070, and an image output unit 1080.

The image obtainment unit 1010 obtains a captured image that is captured by the image capturing unit 100, and stores the obtained image in the data storage unit 1020. Note that an image obtained by the image capturing unit 100 may be a color image, or may be a depth image. It may be any type of image if it is an image in which fingers can be distinguished. The data storage unit 1020 stores data for a CG model for displaying in a mixed reality, a captured image that is inputted from the image obtainment unit 1010, and data for a finger model that is generated by the finger model generation unit 1040.

The position and orientation estimation unit 1030 estimates a position and orientation of the image capturing unit 100. For example, the position and orientation of the image capturing unit 100 is estimated by using the ICP (Iterative Closest Point) algorithm disclosed in P. J. Besl and N. D. Mckay, "A method for registration of 3-D shapes", IEEE Trans. Pattern Analysis and Machine Intelligence, 14(2), pp. 239-256, 1992, and matching (i) a predefined marker and a projection result of a three-dimensional shape with (ii) a marker and a position of a natural feature extracted from a captured image.

By estimating a finger region of a user from a captured image, the finger model generation unit 1040 generates a planar (two-dimensional) or three-dimensional finger model. For example, a finger region is extracted by performing skin color extraction from an image obtained by the image capturing unit 100, and a polygon model that aligns with the finger region is generated as a finger model. Alternatively, configuration may be taken such that the shape of fingers are learned from a large number of hand images in advance, and a polygon model is generated by estimating finger shapes from a captured image based on learning data.

The collision determination unit 1050 performs a collision determination between a finger model generated by the finger model generation unit 1040 and a CG model stored in the data storage unit 1020. For example, each of bounding spheres (a sphere that comprises a model) for a finger model and a CG model is generated, and a collision determination between spheres is performed. A CG model may be any virtual object, and may be a virtual eraser, for example.

When it is determined by the collision determination unit 1050 that the finger model and the CG model have collided, the control unit 1060 calculates positions after the collision of the finger model and the CG model, and stores these positions in the data storage unit 1020. For example, if the finger model has sunk into the CG model, the control unit 1060 calculates an interference depth vector corresponding to a minimum movement amount for the finger model such that the finger model ceases to be sunk into the CG model, and moves the finger model to the surface of the CG model based on the interference depth vector. Note that the finger model may be moved as a rigid body, and the finger model may be deformed after approximation using a finite element model, a spring model, or a pressure model.

Figure 2:
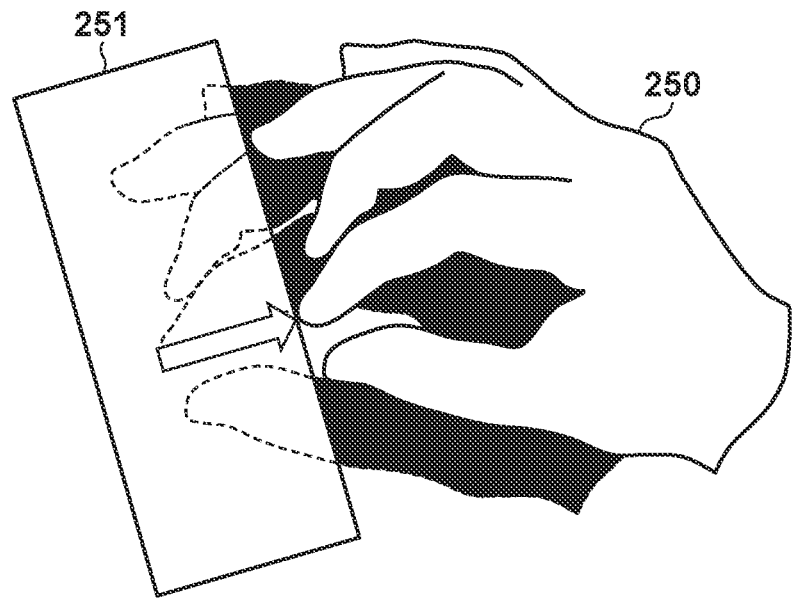
FIG. 2 is a view that illustrates a finger model according to the first embodiment.
Figure 3:
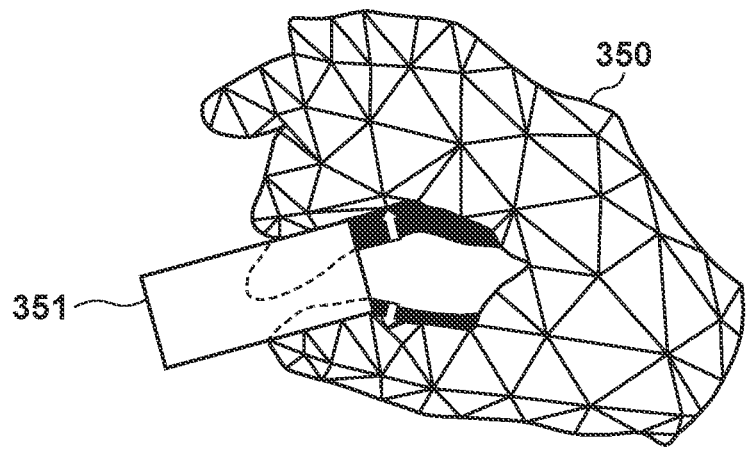
FIG. 3 is a view that illustrates a finger model according to the first embodiment.

For example, FIG. 2 illustrates an examples of treating a finger model 250 as a rigid body and causing it to move to a position where it is not sunk into a CG model 251. FIG. 3 illustrates an example of treating a finger model 350 as a spring model and causing it to deform and move to a position where it is not sunk into a CG model 351. Any method may be used if it is possible to move a finger model to a position where the finger model is not sunk into a CG model.

The image processing unit 1070 refers to the CG model and the finger model after the deformation, which are stored in the data storage unit 1020, and generates an image for presenting to a user how the CG model is being held. For example, actual fingers are displayed at a position before the deformation transition by the control unit 1060, and filling or inpainting (filling in a lost region with an estimation based on the background region) is performed with respect to a region (the black regions illustrated in FIG. 2 and FIG. 3) where the finger model was originally present.

The image output unit 1080 outputs an image processed by the image processing unit 1070 to the display unit 200 and causes it to be displayed thereon.

<Processing Procedure>

Firstly, FIG. 4 is a flowchart illustrating a procedure for processing by the finger model generation unit 1040 according to the first embodiment. In step S2110, the finger model generation unit 1040 obtains, via the image obtainment unit 1010, an image that the image capturing unit 100 is capturing. For example, the image obtainment unit 1010 is a video capture card that obtains an image obtained from the image capturing unit 100.

In step S2120, the finger model generation unit 1040 extracts a skin color region (a finger region) from the captured image. For example, it is determined whether a pixel value of a captured image is a skin color, and a binary image for which a skin color region determined to be a skin color is extracted is generated. Configuration may be taken to calculate an area of a region, and remove small skin color regions (a skin color region having an area less than or equal to a threshold) here.

In step S2130, the finger model generation unit 1040 performs contour extraction processing with respect to the skin color region generated in step S2120, and extracts a finger outline. In step S2140, the finger model generation unit 1040 generates a finger mesh (polygon) model (finger model) from the extracted outline. For example, a finger mesh model is generated by applying a Delaunay triangulation and a convex decomposition to planar polygons generated by joining outline vertices in order.

In step S2150, the finger model generation unit 1040 sets deformation calculation parameters to the generated finger mesh model. As the mesh model, a finite element model or a mass point spring model may be used, for example. For example, in the case of a mass point spring model, masses are set with respect to vertices, and damper coefficients or spring coefficients are set with respect to lines that connects vertices.

In step S2160, the finger model generation unit 1040 associates the vertices of the finger model and coordinates of the captured image to display the actual finger image at positions after movement of the finger model. The series of processes for FIG. 4 thus ends.

Next, FIG. 5 is a flowchart illustrating a procedure for processing by the collision determination unit 1050 and the control unit 1060 according to the first embodiment.

In step S2210, the collision determination unit 1050 determines whether the finger model has collided with the CG model. When it is determined that the finger model has collided, the processing proceeds to step S2220. Meanwhile, when it is determined that the finger model has not collided, the processing terminates without deforming or moving the finger model.

In step S2220, the control unit 1060 calculates and obtains an interference depth vector for the interference between the finger model and the CG model for which the collision determination was made. For example, it is possible to obtain the interference depth vector by applying the Gilbert-Johnson-Keerthi Algorithm (GJK algorithm) disclosed in E. G. Gilbert, D. W. Johnson, and S. S. Keerthi, "A fast procedure for computing the distance between complex objects in three-dimensional space.", IEEE Trans. Robotics & Automation, 4(2), pp. 193-203, April 1988 to the models that collided.

In step S2230, the control unit 1060 controls a display form of the finger model based on the interference depth vector. Specifically, it deforms and moves the finger model. For example, in relation to the mesh model (finger model) generated by the finger model generation unit 1040, the finger model as a whole is deformed in accordance with the mass point spring model together with vertices sunk into the CG model being moved to the surface of the CG model. However, there is not always a need to cause a deformation, and any method may be used if it can move the finger model to a position where the finger model is not sunk into the CG model. The series of processes for FIG. 5 thus ends.

Figure 6:
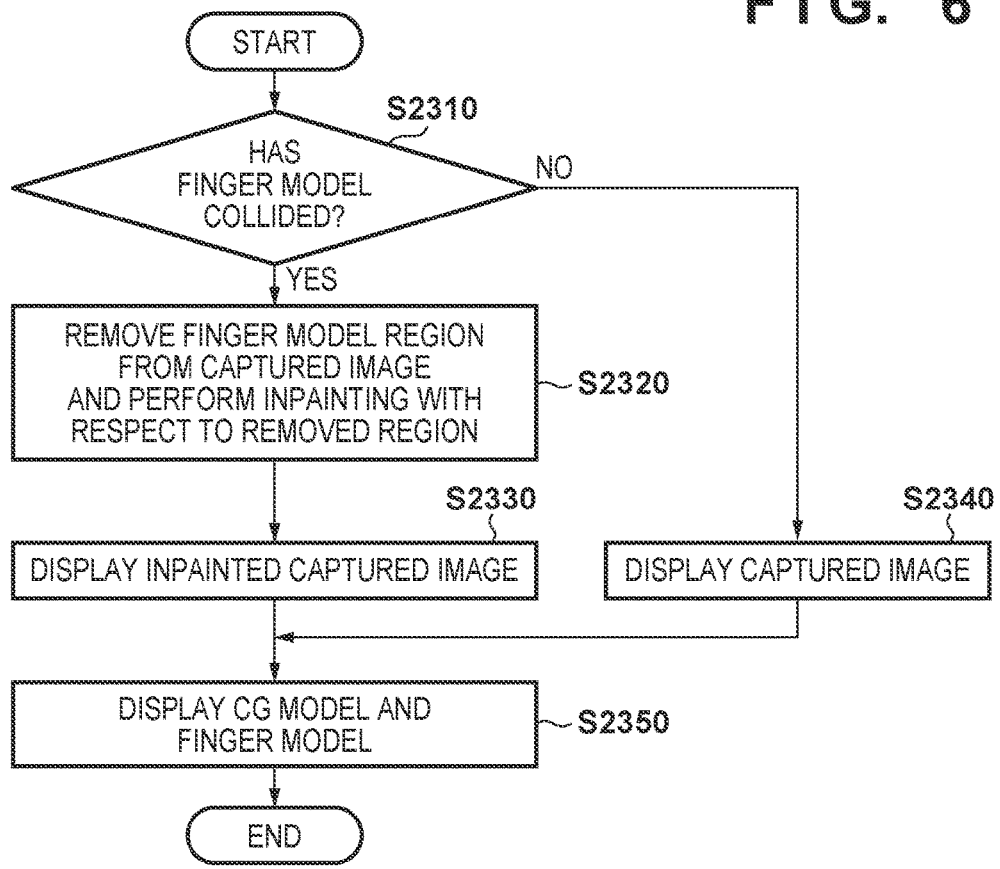
FIG. 6 is a flowchart that illustrates a processing procedure for an image processing unit of the information processing apparatus according to the first embodiment.

Next, FIG. 6 is a flowchart illustrating a procedure for processing by the collision determination unit 1050 and the image processing unit 1070 according to the first embodiment.

In step S2310, the collision determination unit 1050 determines whether the finger model has collided with the CG model. When it is determined that the finger model has collided, the processing proceeds to step S2320. Meanwhile, when it is determined that the finger model has not collided, the processing proceeds to step S2340.

In step S2320, the image processing unit 1070 removes a finger region in the captured image, and performs inpainting with respect to the removed region. For example, association between the captured image and a past position and orientation of the image capturing unit 100 is made in advance. An image close to a position and orientation of the image capturing unit 100 that is estimated by the position and orientation estimation unit 1030 is selected, and feature point correspondences between this image and the captured image are obtained. The removed region is supplemented by an image of the previous frame. However, the removed region may be supplemented by a texture of a peripheral pixel for the finger region. Any method may be used if it can supplement the removed region of the captured image.

In step S2330, the image output unit 1080 renders the captured image that was inpainted in step S2320, and causes it to be displayed on the display unit 200. In step S2340, the image output unit 1080 renders the captured image without changing it, and causes it to be displayed on the display unit 200. In step S2350, the image output unit 1080 superimposes the CG model and the finger model on the captured image, and causes the image resulting from the superimposition to be displayed on the display unit 200. The series of processing for FIG. 6 thus ends.

By this, even in a case where a user's finger would sink into a CG model in a captured image, it is possible to prevent the finger from sinking in, and so it is possible to operate the CG model by a finger model that is similar to what an actual hand is like. By this, operation of the CG model without operationality being impaired becomes possible.

Second Embodiment

In the first embodiment, explanation was given for an example in which inpainting is performed with respect to a physical space. In contrast to this, in the second embodiment, explanation is given of an example of presenting to a user how a CG model is being operated without inpainting a captured image, by displaying an operation state of fingers on a surface of the CG model in the captured image.

Figure 7:
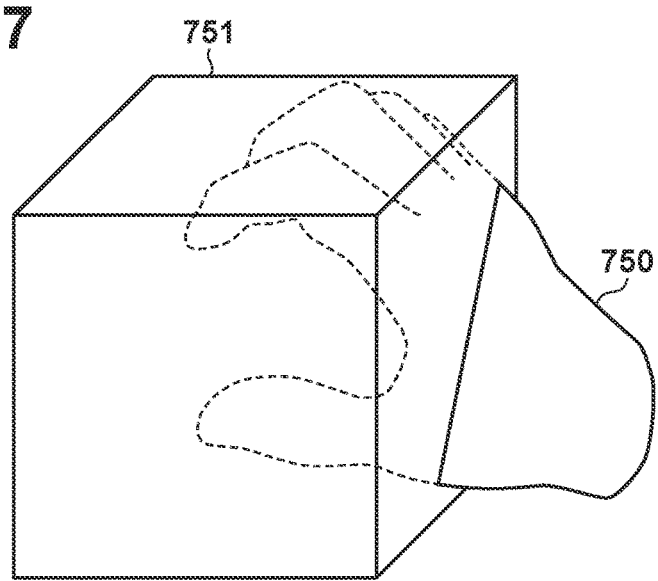
FIG. 7 is a view that illustrates a finger state according to a second embodiment.
Figure 8:
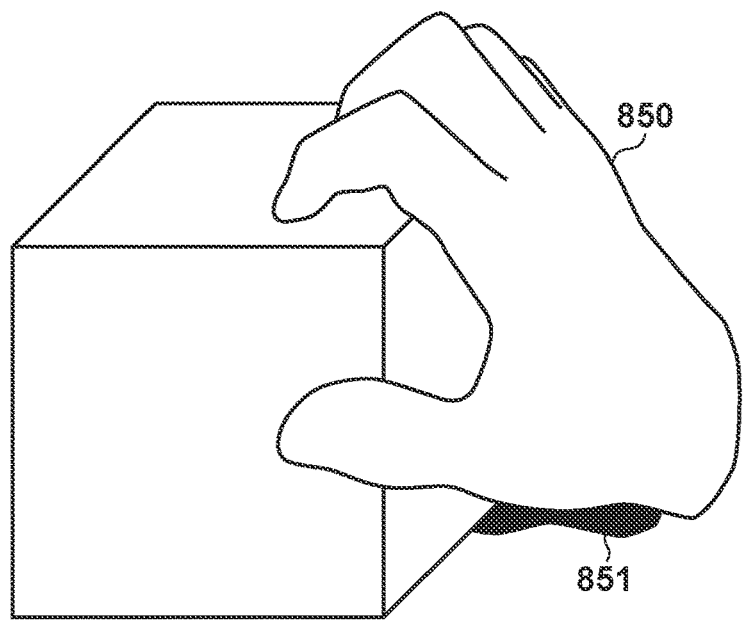
FIG. 8 is a view that illustrates a finger display method according to the first embodiment.
Figure 9:
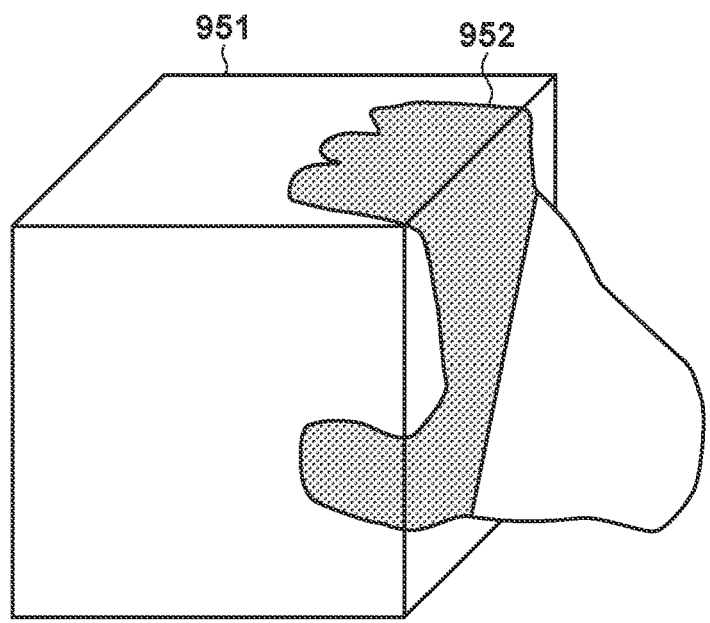
FIG. 9 is a view that illustrates a finger display method according to the second embodiment.
Figure 10:
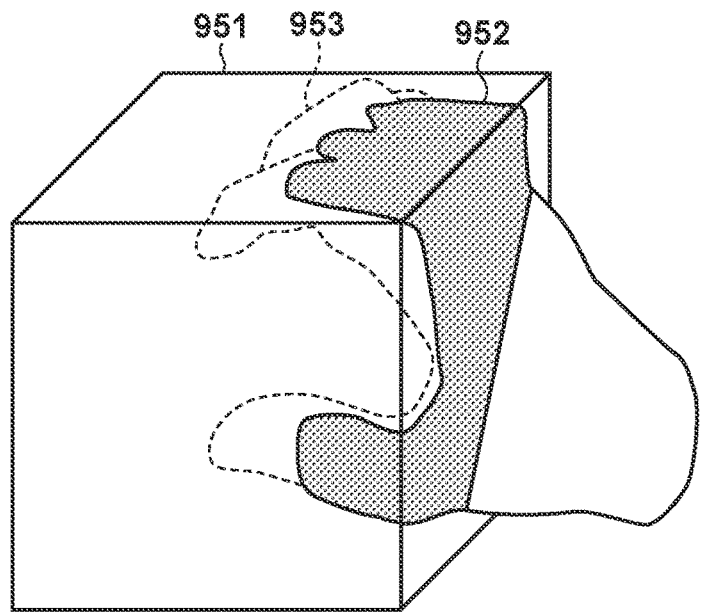
FIG. 10 is a view that illustrates a finger display method according to the second embodiment.

For example, if a finger model 750 has sunk into a CG model 751 as illustrated in FIG. 7, in the first embodiment a finger model 850 is displayed after deformation and movement as illustrated in FIG. 8, and a removed region 851 for fingers that arose due to the movement is inpainted. Meanwhile, in the second embodiment, a finger model is not directly displayed, but as illustrated in FIG. 9, an operation state 952 is displayed on the surface of a CG model 951. Accordingly, the operation state is presented to the user without performing inpainting. In addition, an actual finger region 953 may be subject to semi-transparent display as illustrated in FIG. 10.

<Processing Procedure>

Figure 11:
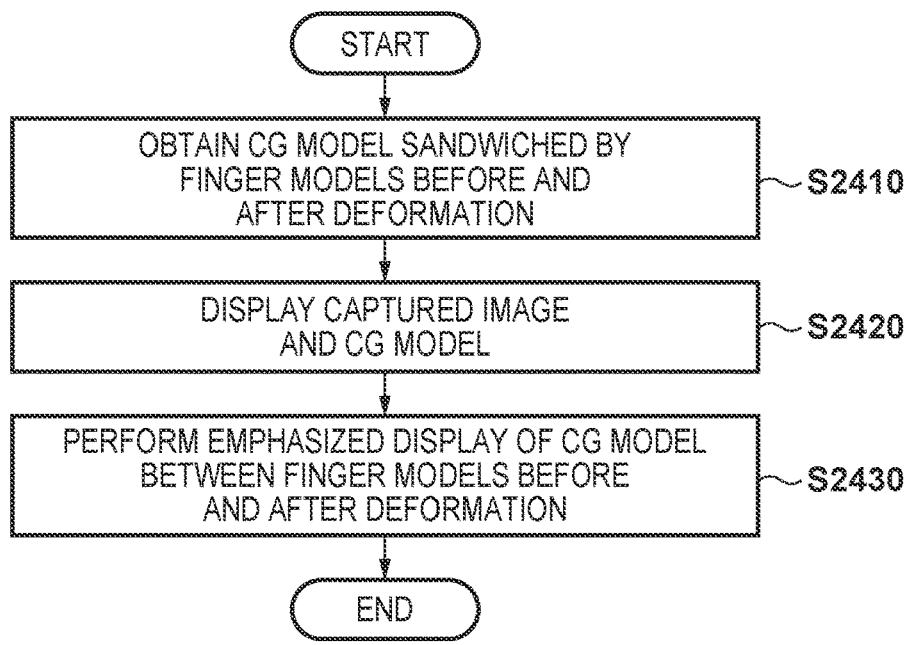
FIG. 11 is a flowchart that illustrates a processing procedure for an image processing unit of the information processing apparatus according to the second embodiment.
Figure 12:
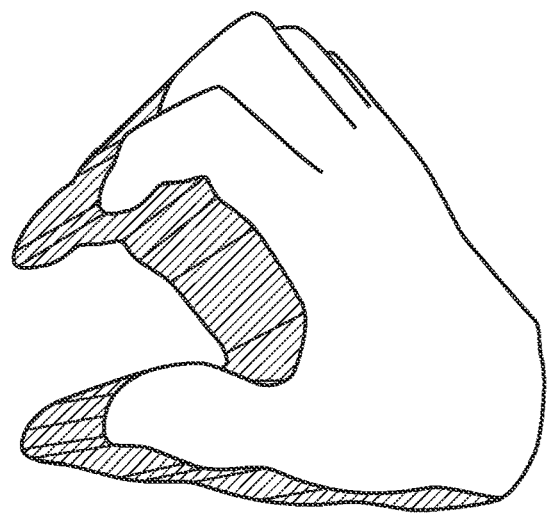
FIG. 12 is a view that illustrates a finger-inclusive model according to the second embodiment.

FIG. 11 is a flowchart illustrating a procedure for processing by the image processing unit 1070 of the second embodiment. In step S2410, the image processing unit 1070 detects and obtains CG model surfaces sandwiched by the finger model before and after a deformation. In detail, firstly a model that comprises a finger model before and after deformation as illustrated in FIG. 12 is generated. For example, a model in which a new plane is formed on a side surface by connecting vertices of the finger model before the deformation and vertices of the finger model after the deformation is generated. Next, by performing depth peeling with respect to the CG model and the generated finger model, CG model surfaces present between the finger model before the deformation and the finger model after the deformation are detected.

Figure 13:
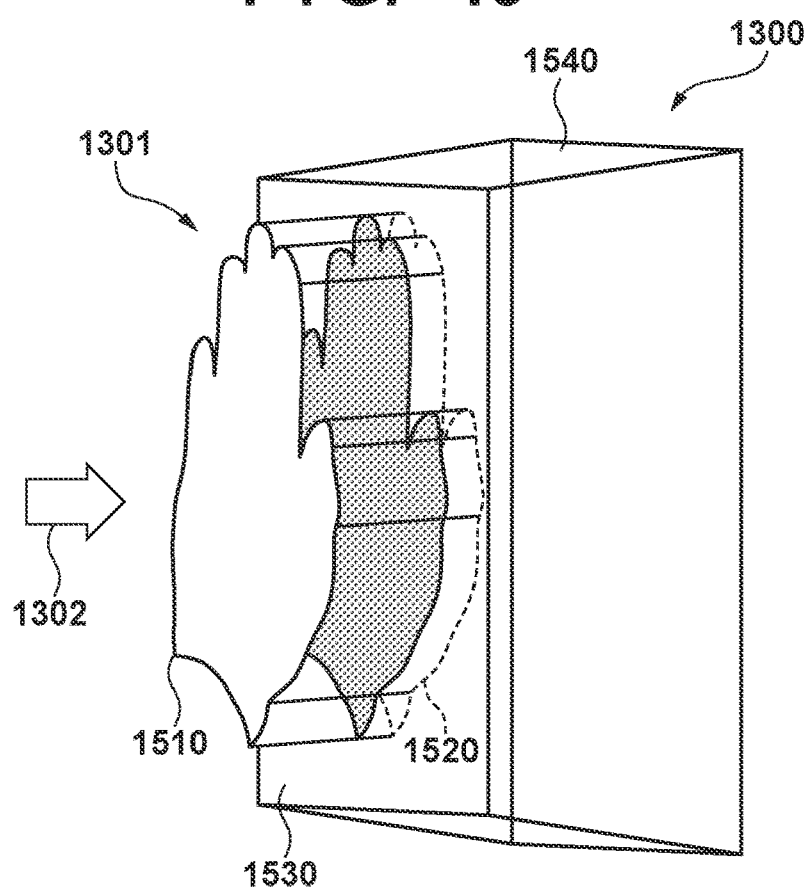
FIG. 13 is a view that illustrates a positional relationship between a CG model and a finger-inclusive model according to the second embodiment.
Figure 14:
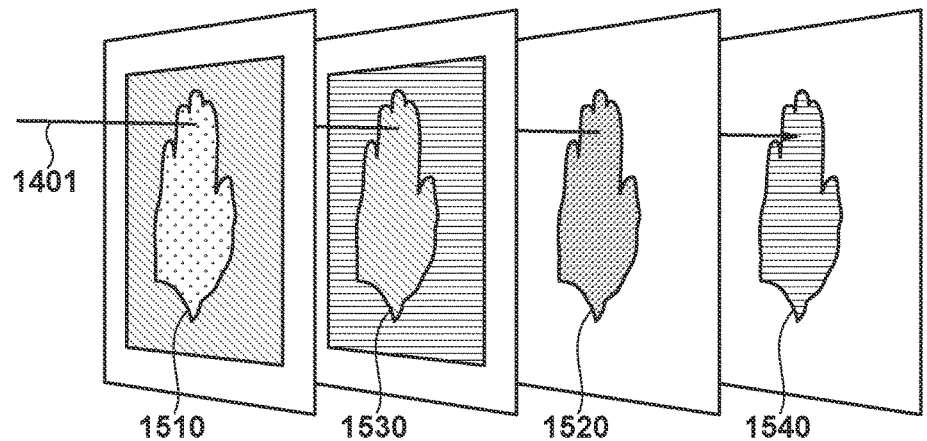
FIG. 14 is a view that illustrates an image resulting from depth peeling according to the second embodiment.

For example, if a finger-inclusive model 1301 (a model where solid lines and dashed lines are connected) has sunk into a rectangular parallelepiped CG model 1300 as illustrated in FIG. 13, when depth peeling is performed from an arrow symbol 1302, four depth images illustrated in FIG. 14 are obtained. Here, an ID of a peeled surface (model) is stored in relation to a pixel of a depth image, and it is possible to detect a surface of the CG model 1300 within the hand if the ID of the depth image is referenced in the order of peeling.

For example, in a straight line 1401 of FIG. 14, when model IDs of depth images are referred to in the order of peeling, they are arrayed in an order of a front surface of the hand 1510, a CG model front surface 1530, a hand back surface 1520, and a CG model back surface 1540. In such a case, because pixels of the second depth image on the straight line of FIG. 14 have a CG model ID but the pixels of the previous and succeeding depth images have a hand ID, it is understood that the CG model in the pixels of the second depth image is present within a finger model (the black region of FIG. 13). However, it is not always necessary to obtain collision surfaces between the CG model 1300 and the finger-inclusive model 1301, and configuration may be taken in which a finger model after deformation is projected on surfaces of the CG model.

In step S2420, the image processing unit 1070 superimposes the CG model onto the captured image, and the image output unit 1080 outputs the image after the superimposition to the display unit 200 to cause it to be displayed. In step S2430, the image output unit 1080 performs an emphasized display as illustrated by the operation state 952 of FIG. 9 for the CG model surfaces detected in step S2410 by the image processing unit 1070. In other words, the operation state is displayed by performing a distinguishably display such as performing an emphasized display for the finger model on the CG model surfaces between finger models before and after the deformation. Note that a finger region image of the captured image may be used for the region in which to perform an emphasized display. The series of processing for FIG. 11 thus ends.

By virtue of the present embodiment, it is possible to present to a user how a CG model is being operated without performing inpainting on a captured image.

Third Embodiment

In the first embodiment, explanation was given of an example in which gap-filling processing based on two-dimensional image information is performed when performing inpainting in alignment with deformation and movement of a finger model. In contrast to this, in the third embodiment, explanation is given of an example of supplementing a captured image based on a physical space, by generating three-dimensional reconfiguration data for the physical space and using the three-dimensional reconfiguration data to perform the supplementing.

<Configuration>

Figure 15:
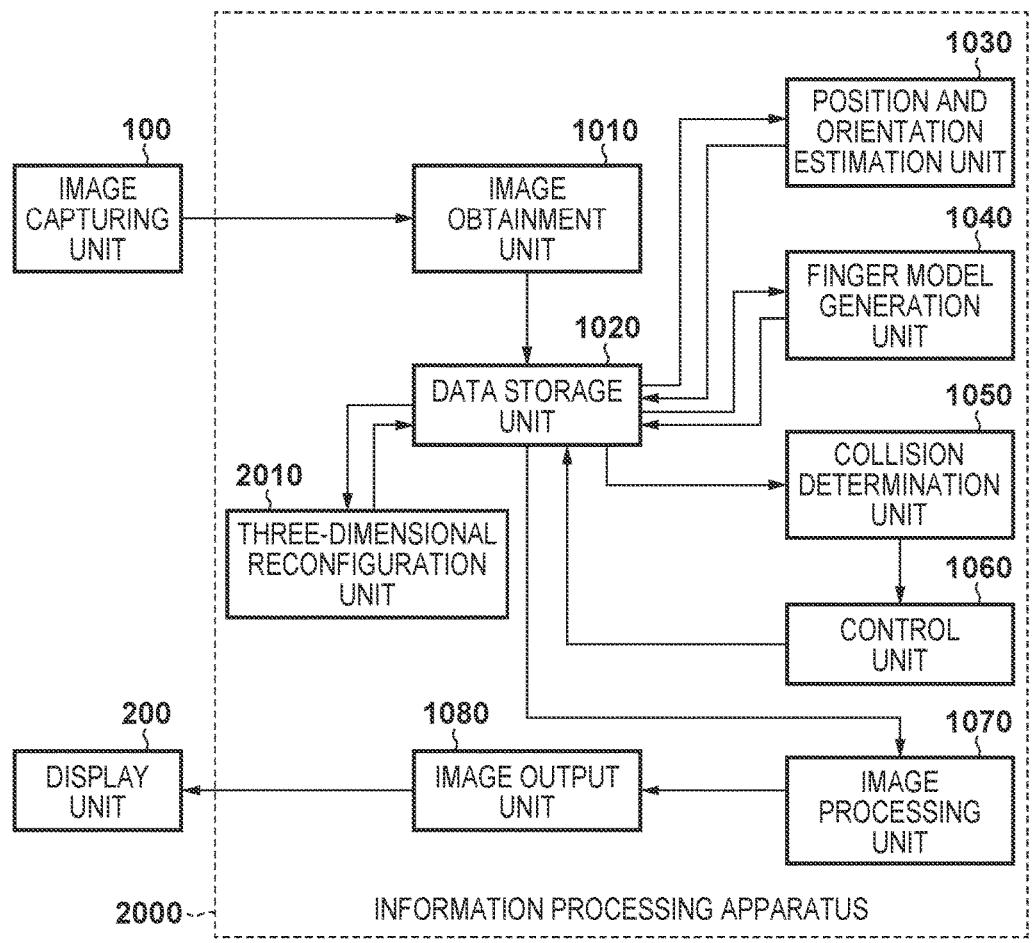
FIG. 15 is a block diagram that illustrates an example of a functional configuration of an information processing apparatus according to a third embodiment.

FIG. 15 illustrates an overview configuration of an information processing apparatus 2000 according to the present embodiment. In the third embodiment, in addition to the configuration of the first embodiment, a three-dimensional reconfiguration unit 2010 is added. The three-dimensional reconfiguration unit 2010 obtains a captured image and a position and orientation of the image capturing unit 100 from the data storage unit 1020, and uses this information to generate a three-dimensional point group of a physical object. In addition, the generated three-dimensional point group and color information is stored in the data storage unit 1020. Note that the position and orientation estimation unit 1030 performs aligning by using feature points extracted by the three-dimensional reconfiguration unit 2010.

<Processing Procedure>

Figure 16:
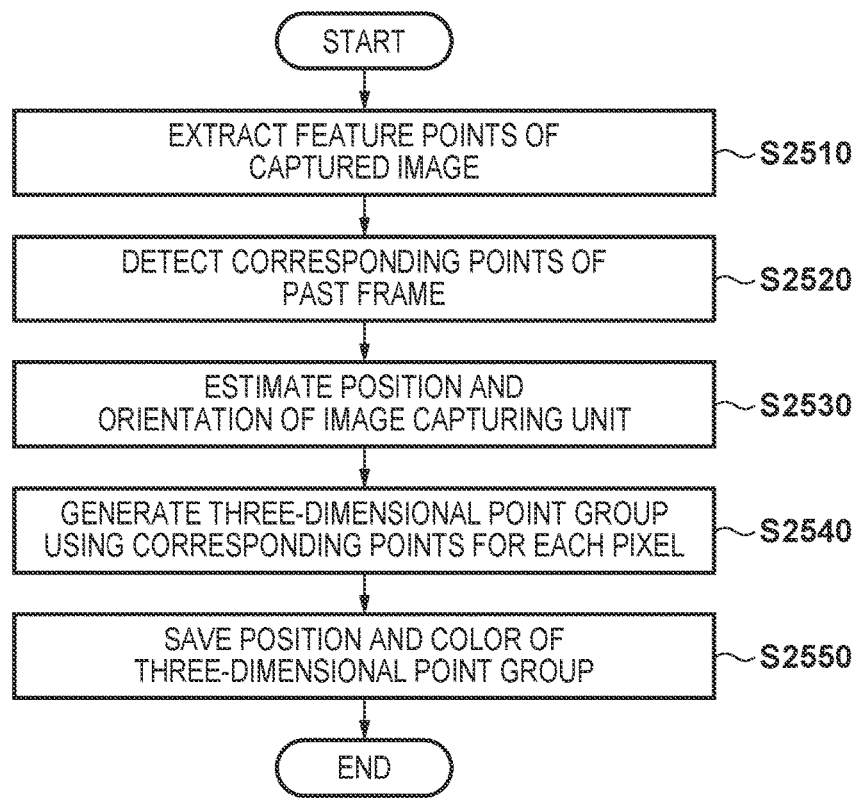
FIG. 16 is a flowchart that illustrates a processing procedure for an image processing unit of the information processing apparatus according to the third embodiment.

FIG. 16 is a flowchart that illustrates a procedure for processing by the three-dimensional reconfiguration unit 2010 and the position and orientation estimation unit 1030 according to the present embodiment.

In step S2510, the three-dimensional reconfiguration unit 2010 uses a FAST feature amount from the captured image to extract feature points that are in the image. However, there is no limitation to a FAST feature amount, and anything may be used if it enables feature points to be detected, such as a SIFT feature amount or a SURF feature amount. Note that it is not necessary to extract a feature in a hand region.

In step S2520, the three-dimensional reconfiguration unit 2010 detects a feature point of a captured image for a past frame that correspond to the extracted feature point, and saves corresponding point information that corresponds between the frames in the data storage unit 1020.

In step S2530, the position and orientation estimation unit 1030 calculates the position and orientation of the image capturing unit 100 and the three-dimensional position of the feature points from the corresponding point information that corresponds between the frames. In step S2540, the three-dimensional reconfiguration unit 2010 obtains corresponding points for each pixel between step images, and generates a three-dimensional point group in accordance with the principle of triangulation as three-dimensional reconfiguration data.

In step S2550, the three-dimensional reconfiguration unit 2010 stores pixel color information and the calculated three-dimensional position of the three-dimensional point group in the data storage unit 1020. The series of processing for FIG. 16 thus ends.

After displaying the point group for which a three-dimensional reconfiguration has been performed with respect to the finger region of the captured image by using the three-dimensional reconfiguration data, the image processing unit 1070 displays the CG model and the finger model. By virtue of the present embodiment, it is possible to operate a CG model during display of a background of a physical space without a sense of unnaturalness.

By the present invention, operation of a CG model without impairment of user operationality becomes possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-152286, filed Aug. 2, 2016, which is hereby incorporated by reference wherein in its entirety.

What is claimed is:

1. An information processing apparatus, comprising:
a memory configured to store instructions; and
a processor configured to execute the instructions to function as:
an extraction unit configured to extract a finger region from a captured image;

a generation unit configured to generate a finger model from the finger region;

a determination unit configured to perform a collision determination for a collision between the finger model and a CG model superimposed on the captured image; and a control unit configured to:
when the collision determination indicates that the finger model has sunk into the CG model, calculate a movement amount of the finger model such that the finger model is not sunk into the CG model; and control a display form of the finger model based on the determined movement amount of the finger model such that the finger model is not sunk into the CG model.

2. The information processing apparatus according to claim 1, wherein the control unit is configured to control at least one of a shape and a display position of the finger model based on the result of the collision determination.

3. The information processing apparatus according to claim 1, wherein the processor is further configured to execute instructions to function as a processing unit configured to perform processing that removes the finger region from the captured image, and inpaints the removed region.

4. The information processing apparatus according to claim 3, wherein the processing unit is configured to perform processing that supplements the removed region in accordance with an image of a previous frame.

5. The information processing apparatus according to claim 3, wherein the processing unit is configured to perform processing that supplements the removed region in accordance with a texture of a peripheral pixel of the finger region.

6. The information processing apparatus according to claim 1, wherein the processor is further configured to execute instructions to function as a processing unit configured to perform processing that displays a finger operation state on a surface of the CG model in the captured image.

7. The information processing apparatus according to claim 6, wherein the processing unit is configured to display the operation state by obtaining a surface of the CG model that is sandwiched by the finger model before and after the display form control by the control unit, and distinguishably display the finger model on the surface.

8. The information processing apparatus according to claim 6, wherein the processing unit is configured to display the finger region as semi-transparent, in addition to displaying of the operation state.

9. The information processing apparatus according to claim 1, wherein the processor is further configured to execute instructions to function as:
a reconfiguration unit configured to obtain three-dimensional reconfiguration data of a physical space, and
a removal unit configured to remove the finger region of the captured image, and supplement the finger region by using the three-dimensional reconfiguration data.

10. The information processing apparatus according to claim 1, wherein the control unit is further configured to:
calculate the movement amount of the finger model based on an interference depth vector corresponding to an interference between the finger model and the CG model;
control the display form of the finger model by deforming or moving the finger model to a surface of the CG model based on the interference depth vector.

11. A method of controlling an information processing apparatus, comprising:
extracting a finger region from a captured image;
generating a finger model from the finger region;
performing a collision determination for a collision between the finger model and a CG model superimposed on the captured image;
when the collision determination indicates that the finger model has sunk into the CG model, calculating a movement amount of the finger model such that the finger model is not sunk into the CG model; and
controlling a display form of the finger model based on the determined movement amount of the finger model such that the finger model is not sunk into the CG model.

12. A non-transitory computer-readable storage medium storing a computer program for causing a computer to execute a method of controlling an information processing apparatus, the method comprising:
extracting a finger region from a captured image;
generating a finger model from the finger region;
performing a collision determination for a collision between the finger model and a CG model superimposed on the captured image;
when the collision determination indicates that the finger model has sunk into the CG model, calculating a movement amount of the finger model such that the finger model is not sunk into the CG model; and
controlling a display form of the finger model based on the determined movement amount of the finger model such that the finger model is not sunk into the CG model.

* * * * *